J. B. VAUGHN.
Plow.
No. { 358, 31,362. }
Patented Feb. 5, 1861.
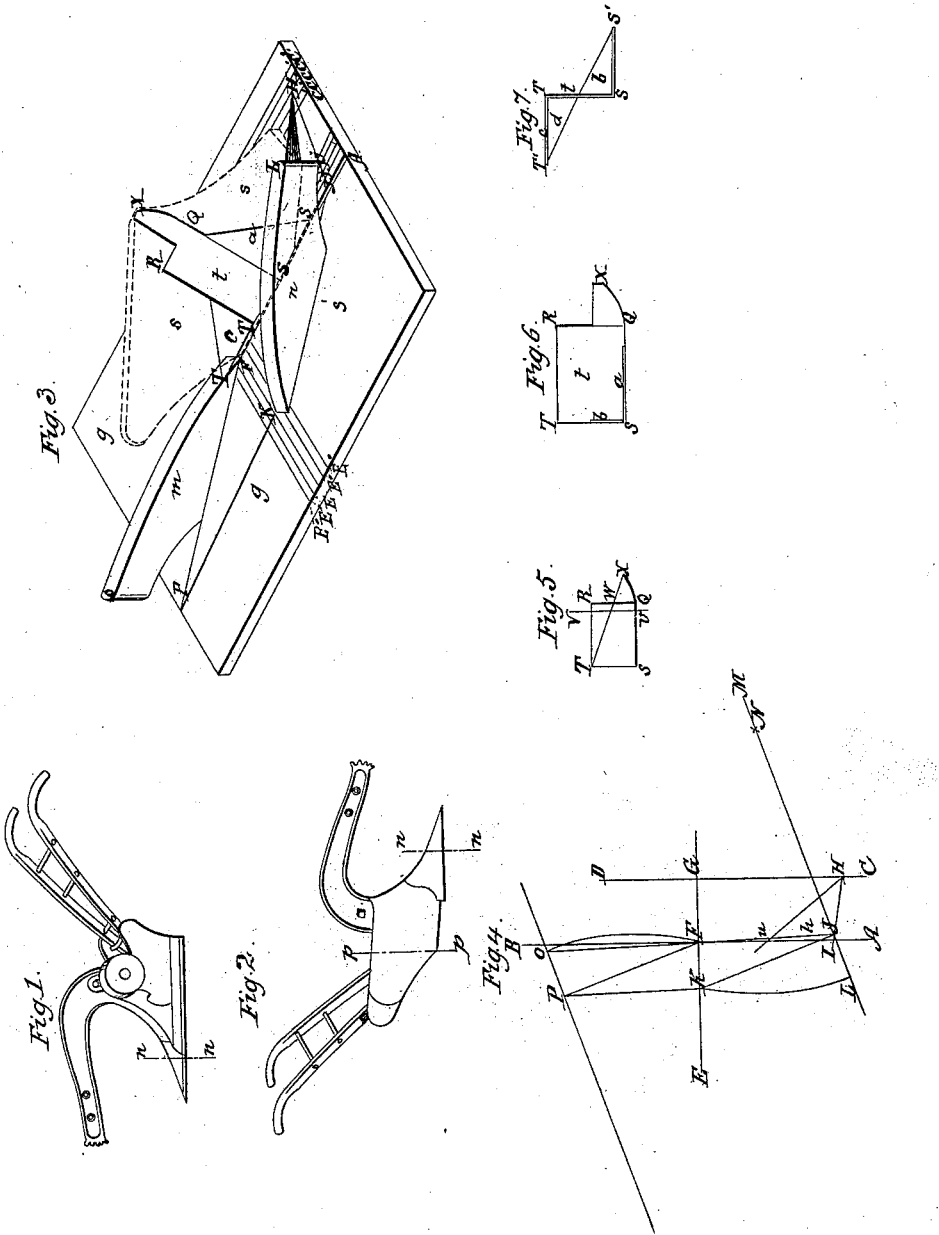
Witnesses:
R. F. Osgood.
E. N. Smith
Inventor:
James B. Vaughn
By his atty.
J. S. Brown

UNITED STATES PATENT OFFICE.

JAS. B. VAUGHN, ADMINISTRATOR OF THE ESTATE OF EBENEZER VAUGHN, OF MARION, NEW YORK.

IMPROVEMENT IN GAGES FOR CONSTRUCTING THE MOLD-BOARDS OF PLOWS.

Specification forming part of Letters Patent No. 31,362, dated February 5, 1861.

*To all whom it may concern:*

Be it known that EBENEZER VAUGHN, late of Marion, in the county of Wayne and State of New York, did, in his life, invent a new and Improved Method or Gage for Constructing the Mold-Boards of Plows; and I, JAMES B. VAUGHN, of the town, county, and State above named, administrator of the estate of the said EBENEZER VAUGHN, deceased, do hereby declare that the following is a full and exact description thereof, reference being had to the accompanying drawings, making part of this specification—

Figure 1 being a land-side view of a plow to assist in illustrating the improvement; Fig. 2, a mold-side view of a plow for a similar purpose; Fig. 3, a view in perspective of the improved gage complete arranged for the operation of shaping the mold-board; Fig. 4, a diagram illustrating the principles and rule from and by which the construction of one part of the gage is derived; Fig. 5, another diagram, illustrating the principles and rule for constructing the other part of the gage; Figs. 6 and 7, different views of the movable part of the gage.

Like letters designate corresponding parts in all the figures.

The object of the invention is to produce a gage by which the mold-boards of plows may be readily and invariably shaped so as to possess a uniformity of twist or curvature, which will secure equality of pressure upon every part, avoid inequality of wear, and prevent the lodgment of earth on any portion thereof, and which will effectually raise and turn the furrow-slice in an easy and natural manner.

The following description of the construction of the diagrams Figs. 4 and 5, and explanation of the principles or *rationale* thereof, will sufficiently set forth the foundation on which the practical device is based. Draw the straight line A D, Fig. 4. Draw also the line C D parallel to A B. The space between these two lines represents the width of the furrow to be cut. Take at will in A B a point, F, and through it draw the line E F G at right angles to A B, to indicate the place of a vertical plane that will intersect at right angles the furrow at the point where half-rolled, or where raised to a perpendicular position.

Take a point, H, in C G such distance from G as it is desired the extremity of the point of the plow should be from G, or from the plane intersecting at right angles the furrow at the point where half-rolled, and from H draw the line H I at an angle of about eighty degrees with C D. From F draw F J so far within A F at I, or at such an angle with A F, as will give to the plow the requisite slight wedge form. Take a point, K, in the line E F such distance from F as shall be equal to the average depth of the furrow to be cut, and draw the line J K. Draw also the line L J M at right angles to J K, making the distance from J to L equal to that from F to K. Find a point, N, in the line J M, about which as a center a circle can be struck through L K, and describe the arc L K. Draw the line F O so far without the line F B at O as that the line K P, drawn parallel with F O, shall cause the mold-board to crowd a little upon the rolling furrow. Draw F P equal to J K, and describe the arc F O in the same manner as L K. Draw the parallelogram Q R S T, Fig. 5, making Q R equal to the depth of the furrow to be cut, and R T equal to the width of it. Draw the line U V, shortening the parallelogram by a distance equal to the width of the point of the plow at its extremity, and making the distance from U to V equal to that from U to S. Bisect Q R at W and draw T W X, and about V as a center describe the arc U X.

Now, let J K P F, Fig. 4, represent a section of a horizontal plane, and let J L K and P O F represent sections of planes raised from a horizontal to a vertical position upon J K and P F, or of planes perpendicular to the plane J K P F, and resting upon J K and P F as bases; also, let S T X, Fig. 5, represent a section of a plane, and apply the angle S thereof to the line J F, Fig. 4, opposite the end of the mold-board—say at *h*—and the angle T of the same section to the arc L K, the end of the mold-board and the position of the plane S T X in respect to the mold-board being indicated by the line *n*, Figs. 1 and 2. Then move the section toward K F at right angles always to A B and parallel to the vertical plane coinciding with E F G, with the angle S upon J F and the angle T upon the arc L K, until K F be reached, where S T will coincide with F K and the line S U of the moving section will be vertical, F K being in the vertical plane intersecting at right angles the furrow at the point where half-rolled, the position of which plane relative to the mold-board is indicated by the line $p$, Fig. 2. Move the section still farther on, keeping it at right angles to A B and the angle S upon the arc O F, and the angle T upon K P until P O be reached, and the face of the mold-board will be projected by the line S Q X, as the section S T X is thus moved over or along the section J K P F. The line H $u$ represents the obliquity of the wing of the point to the landside H G, which obliquity may be varied to suit the different descriptions of land to be plowed. By slight modifications of the length of the lines J L and O P, J K and F P, and slight variations of the angles J F I and O F B, and changes in the section S T X to correspond, the form of the mold-board may be varied, and specially adapted to the plowing of different depths and of different soils.

In order to apply the above principles to practical use, a gage is constructed so as to embody the theoretical construction of the two diagrams.

First, a stationary gage, or part of the complete gage, is constructed by the rule of the diagram Fig. 4. A plane board or table, $g$, Fig. 3, is provided, on which all the other parts rest, and on which is projected the parallelogram or section of the horizontal plane J K P F, represented thereon by the same letters as in the diagram. The projection of this parallelogram is performed precisely as described in constructing the diagram. Also upon this table are projected the lines A B, C D, E G, and H $u$; and in order that the gage may be adapted to varying the mold-board in length, to varying the width and depth of the furrow, and to varying the wedge action upon the furrow-slice, according to different kinds and conditions of land to be plowed, several lines parallel with C D, as indicated at C' C' C' C', parallel with E G, as indicated at E' E' E' E', at different angles of divergence from the line A B, as indicated at J' J' J' J', and at different angles of divergence from the line C D, starting from the point H, as indicated, may be projected on said table at regular intervals, and to a scale of feet, inches, and their subdivisions, or of degrees. These scale-lines, however, are not necessary, since all the variations may be obtained by simple measurement, as the occasions may require. Then upon this horizontal board or table are secured strips or blocks $m$ $m$, whose inner faces are in vertical planes, and coincide with the lines F P and J K—two opposite sides of the parallelogram J K P F. Their upper inner edges, from K to L and from E to O, are, previously to attaching them to the horizontal board or table $g$, formed by the rule laid down in the description of the corresponding part of the diagram Fig. 4. In the lines from J to F and from K to P are cut slight grooves, so as practically to guide the respective angles S and T of the movable gage exactly in those lines in moving along.

Second, a movable gage or part of the complete gage, Figs. 6 and 7, is constructed according to the rule of the diagram Fig. 5. This consists principally of a simple thin plate, $t$, which may most conveniently be made of metal. This plate is to represent a cross-section of the furrow-slice as the plow moves under the same; and in order that the plate may be practically kept in vertical and parallel planes as it moves along over the stationary gage, a projecting plate, $a$, with a brace, $b$, to keep it in place, is provided, so that the edge S S' thereof may run in the line-groove J F and keep the plate $t$ at a constant angle to said line and to the horizontal plane. A similar plate, $c$, with a brace, $d$, projects from the angle T, so that the edge T T' thereof may run in the line-groove K P for a similar purpose. Any equivalent means to keep the plate $t$ at a constant angle to the horizontal plane and parallel with the line E G thereon may be employed.

The stationary and movable parts of the gage being thus constructed, they are used in the following manner: A suitable block out of which to form a mold-board or pattern for casting mold-boards is prepared and secured upon the stationary gage in the position indicated by red lines, Fig. 3. The movable gage is then applied upon the stationary gage in the manner explained in describing the diagrams Figs. 4 and 5, and as it is moved along the face of the mold-board is shaped as its under edge, S Q X, indicates or directs. The positions of all the parts in the act of gaging the form of the mold-board or pattern $s$ are indicated in Fig. 3. The line-groove J F represents the fulcrum-line in the furrow on which the furrow-slice turns till it attains an edgewise vertical position, and the angle or point S indicates the fulcrum-edge of the furrow-slice. In like manner the line-groove K P represents the fulcrum-line in the furrow on which the furrow-slice turns after it passes the edgewise vertical position, and the angle or point T indicates the fulcrum-edge of the furrow-slice in that position. Since the inner lower edge of the furrow-slice in moving to an edgewise vertical position or through an arc of ninety degrees has a side movement equal to the distance from the line J F to a parallel line passing through the point K, therefore the vertical plane face J K L, reaching in a straight line from J to K and guiding the angle T of the movable gage, (corresponding with the outer upper edge of the furrow-slice,) causes the side movement of the movable gage (representing the furrow-slice) to be uniform throughout; and since the angle T (representing the outer upper edge of the furrow-slice) must, in the same extent of movement, descend from the point L to the point K, the regular curved line connecting those two points, so as to keep the angle T thereon, likewise causes the ascending movement of the said angle T (representing as above) to be uniform. Therefore the resultant movement derived from these two elements gives that uniformity of action of the mold-board upon the furrow-slice designated in the object of this invention. The same course of reasoning applies to the remaining movement of the movable gage (representing the furrow-slice) upon the fulcrum-line K P.

It may be here remarked that if the mold-board s were to extend back so that the movable gage should continue to determine its form till arrived at the point P, the mold-board thus produced would turn the furrow-slice completely over or reverse its position on the ground; but since it is not generally desirable to turn the furrow-slice so far, but only to an angle of, say, forty-five degrees with the horizon, the mold-board in that case should terminate when the movable gage reaches only half of the distance between K and P, and so in the same proportion for any other angle at which it may be desired to lay the furrow-slice.

What I claim as the invention of EBENEZER VAUGHN, deceased, is—

The gage t, constructed as set forth, in combination with the two curved directors or guides m and n, in the manner and for the purpose herein specified.

JAMES B. VAUGHN.

Witnesses:
    LEVI CLARK,
    ISRAEL SPRINGER.